Jan. 22, 1957
A. E. HAAS
2,778,141
FISHING LINE GUIDE
Filed Dec. 10, 1954
Fig. 1
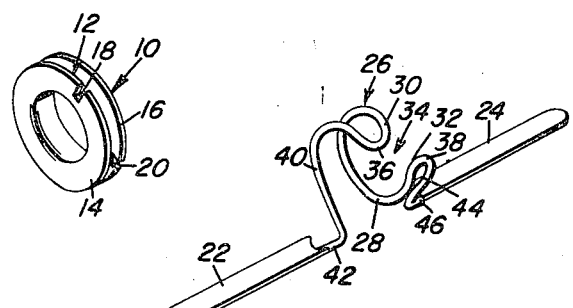
Fig. 2
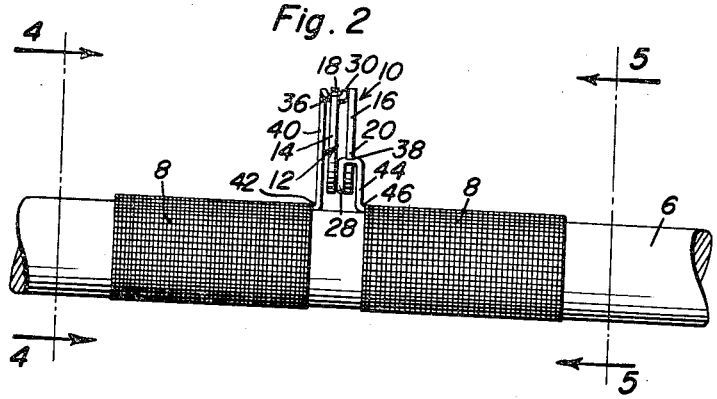
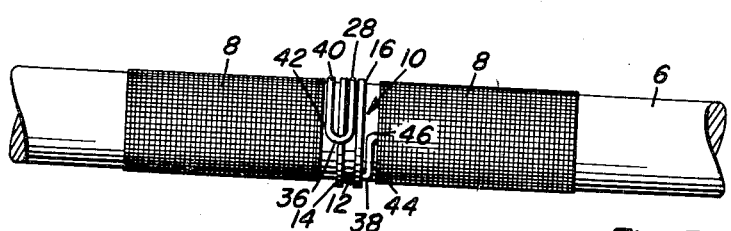
Fig. 3

Alfred E. Haas
INVENTOR.
BY *Clarence A. O'Brien*
*and Harvey B. Jackson*
Attorneys

United States Patent Office 2,778,141
Patented Jan. 22, 1957

2,778,141

FISHING LINE GUIDE

Alfred E. Haas, Greenwich, N. Y.

Application December 10, 1954, Serial No. 474,543

1 Claim. (Cl. 43—24)

The present invention relates to certain new and useful improvements in a fishing line guide, more specifically, one which is characterized by a guide eye and novel means whereby the same may be detachably mounted on a fishing rod, pole or the like.

As is apparently evident from the preceding general statement of the nature of the invention, the art under consideration, so-called line guide eyes, has to do with many and varied styles and forms of adapters and the mounts which are designed in one manner or another to allow the user to bind or otherwise attach the mount where needed on the rod, and to readily insert and remove the marginally channelled eye or eyelet as it is sometimes called. It will be equally evident to the reader that the instant subject matter has to do with certain structural improvements and special adaptations which, it is believed, better serve the intended purposes and which aptly satisfy the respective requirements of manufacturers, anglers and others.

In carrying out the preferred embodiment of the invention a pair of attaching feet or equivalent members are provided and these are coplanar and in alignment with each other and are adapted to be fastened by nylon cords or equivalent wrappings to the rod at longitudinally spaced points. Supported between the adjacent or inner ends thereof is a specially bent length of strong but resilient piano wire which lends itself to bending or flexing of the rod and is bent between its respective ends to provide an eye seating clamping and mounting stirrup.

More specifically, novelty is predicated upon the so-called stirrup which is generally C-shaped in configuration and which is provided at its open side with lateral fore and aft bends which function as keepers and which are releasably snapped and retained in keeper notches provided in the endless encircling flanges as are usually provided on the attachable and detachable line eye.

Other objects, features and advantages will become more readily apparent from the following description and the accompanying sheet of illustrative drawings.

In the drawings, wherein like numerals are employed to designate like parts throughout the views:

Figure 1 is an "exploded" perspective view of the two principal components; namely, the line guide eye and the specially designed and adaptable mounting means therefore constructed in accordance with the principles of the present invention;

Figure 2 is an assembled elevational view with all the parts in operative relationship;

Figure 3 is a plan view of the same;

Figure 4:
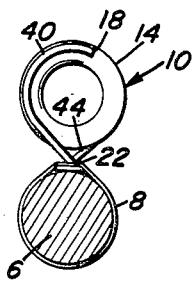
Figure 5:
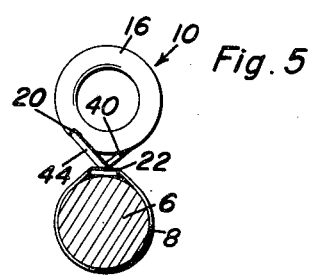

Figures 4 and 5 are sections on the lines 4—4 and 5—5 of Figure 2, respectively, looking in the direction of the respective direction indicating arrows.

It will be evident from Figures 2 and 3 that the fishing rod or pole 6 is of any suitable construction and that customary nylon cords or equivalent wrappings 8—8 are used for binding the aforementioned mounting means on the rod.

With reference to Figure 1 at the left, the eyelet or line guide eye, which is more or less conventional in type, is denoted by the numeral 10. It is an endless ring and is channel-shaped at the peripheral portion, the channel being denoted at 12 and situated between the spaced parallel flanges 14 and 16. It will be noted that flange 14 has a keeper notch 18 therein and that flange 16 at its circumferentially spaced point has an equivalent keeper notch 20 therein. Incidentally, it makes no difference which side of the ring is inserted and removed in the mounting means which is about to be described.

The stated means as before mentioned is characterized by a pair of coplanar aligned attaching feet or members 22 and 24. These are of any appropriate construction to fit upon the rod in the manner shown and they are, of course, held in place by the windings of the wrapping cords 8—8. The specially bent length of wire is secured between the inner ends of these attaching feet, the wire is generally indicated by the numeral 26. It is a stiff wire but sufficiently resilient to provide the inherent attaching and retaining properties for the insertable and removable eyelet or guide eye 10. The intermediate portion of the wire is bent upon itself to define what may be differentiated as a substantially C-shaped eye seating and clamping stirrup 28. The spaced upper and lower end portions 30 and 32 of said stirrup are spaced apart sufficiently to define an entrance opening 34 through which the eye 10 may be forcibly pressed, seated and clamped in position. Extending to the left in Figure 1 from the upper end portion 30 is a lateral curvate bend 36 which constitutes a keeper and which is releasably engageable with the keeper seat 18. Extending in an opposite direction from the lower end portion 32 (to the right in Figure 1) is a similar bend 38 which provides a second keeper and which is releasably engageable with a keeper seat or notch 20. There is a long end portion 40 of the wire at the left and the lower end portion 42 is laterally bent and secured to the cooperating end of the second attaching foot 22. This particular wire-end is approximately semi-circular in shape and its curvature conforms to the opposed curvature of the intermediate portion of the C-shaped stirrup 28 as perhaps best realized by comparing Figure 1 with Figure 4 or vice versa. The short wire end at the right takes off from the keeper bend 38 and is denoted at 44 and its terminal portion 46 is integrally joined with the adjacent or inner end of the first foot 24. These two wire-ends 40 and 44 are of appropriate length, convenience and shape to position the C-shaped stirrup at the desired place so that the eyelet or guide eye 10 may be readily snapped into place or removed whenever necessary or desired. It is important to keep in mind the fact that the upper and lower end portions 30 and 32, respectively, of the C-shaped stirrup are spreadable and spread apart and allow the guide eye 10 to be snapped into its intended position. After it is seated the keeper bends 36 and 38 then spring back into the keeper notches 18 and 20 securely anchoring the guide eye in place.

It will be clear that the notches 18 and 20 are suitably placed in the guide eye and the C-shaped stirrup is such that it snaps into the "channel" which encircles the eye. Once the eye is forced into the stirrup and the keeper bends snap back into their intended positions, a secure but releasable mounting for the guide eye is satisfactorily attained. The eye and stirrup provide a complete guide that is sturdy and reliable. The guide in its entirety is flexible enough not to interfere with the flexing of the rod.

Since numerous modifications and changes will readily occur to those skilled in the art, it is not desired to limit the invention to the exact construction shown and described and, accordingly, all suitable modifications and equivalents may be resorted to, falling within the scope of the appended claim.

What is claimed as new is as follows:

A fishing line guide comprising, in combination, a mounting embodying a first attaching foot adapted to rest on a fishing rod, a length of wire provided intermediate its ends with a substantially C-shaped stirrup, a connection between the lower end portion of said stirrup and an adjacent end portion of said first attaching foot embodying a keeper bend disposed lateral to the stated lower end portion of said stirrup, a substantially semicircular wire end spaced in approximate parallelism with respect to the bight portion of said stirrup and having an upper end portion connected to the upper end portion of the stirrup by way of a lateral keeper bend, the lower end portion of said wire-end being in alignment with said first foot, and a second foot having one end connected to the last-named lower end portion and coplanar to and in alignment with said first-named foot, and a guide eye having marginal flanges, said guide eye being releasably mounted in said stirrup, each flange having a keeper notch therein, and the respective keeper bends being releasably seated in the respective keeper notches.

References Cited in the file of this patent

UNITED STATES PATENTS

| | | |
|---|---|---|
| 507,561 | Singleton | Oct. 31, 1893 |
| 759,279 | Houghton | May 10, 1904 |
| 1,511,356 | Morse | Oct. 14, 1924 |

FOREIGN PATENTS

| | | |
|---|---|---|
| 8,488 | Great Britain | 1911 |
| 1,005,740 | France | Sept. 16, 1947 |